Figure 3:
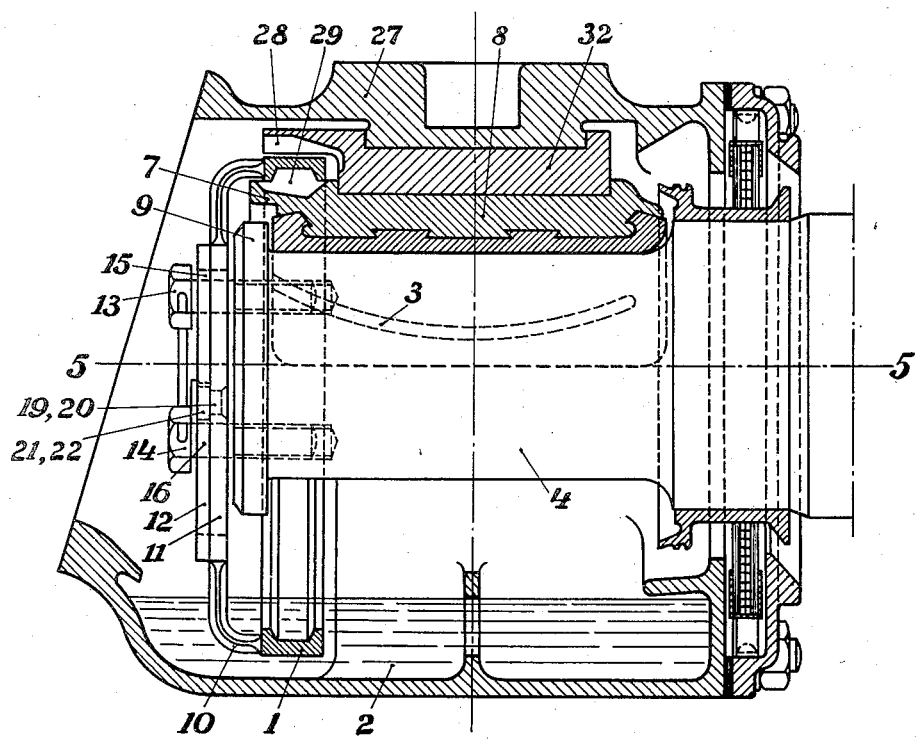

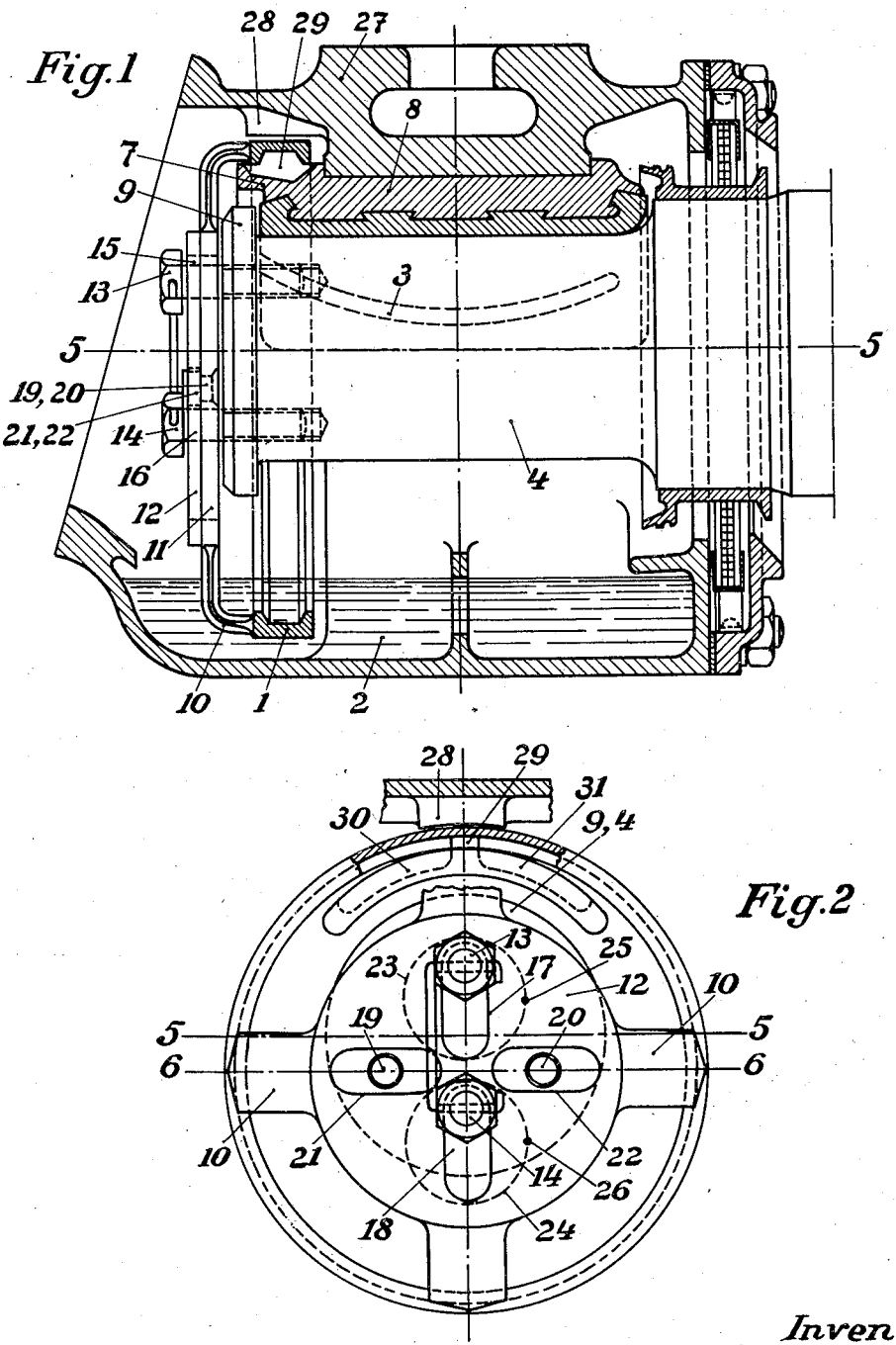

May 19, 1936.    V. A. BARY    2,041,389
AXLE BEARING FOR RAIL VEHICLES
Filed Feb. 16, 1931    2 Sheets-Sheet 2

Inventor
V. A. BARY
By Joseph Hirschman
Attorney

Patented May 19, 1936

2,041,389

UNITED STATES PATENT OFFICE 2,041,389

AXLE BEARING FOR RAIL VEHICLES

Victor Alexander Bary, London, England

Application February 16, 1931, Serial No. 516,150
In Great Britain March 3, 1930

16 Claims. (Cl. 308—85)

In the lubrication of axle-bearings for rail vehicles two fundamentally different methods have heretofore been employed. In the first and older method the lubricant was sucked up from the lubricant supply container by a wick or similar means and a lubricating pad was employed for wetting the axle journal with the lubricant. In the second method the lubricant was thrown up by a centrifugal device connected to the axle-journal and collected and directly conducted to the upper side of the axle-brass, whence it was conveyed in many different ways to the place where it was required. Although the second method was a considerable improvement on the original wick system, it nevertheless necessitated the casing of the centrifugal device being extended to a relatively great width in order to obtain the necessary centrifugal action even when the vehicle was travelling at a low speed. The arrangement of a casing for the centrifugal device of so great a width has been found to be disadvantageous, in particular, in the case of special cars, for example rubbish trucks, and the present invention therefore undertakes the problem of providing an axle-bearing lubrication device which possesses the advantages of the centrifugal methods of lubrication but avoids a wide extension of the casing of the lubricating device. The problem is solved, in accordance with the invention, in that, in axle-bearings for rail vehicles in which the lubricant is conducted to the place where it is required by a rotating ring lubricator, the ring lubricator is positively driven at least in the direction of rotation while in the direction in which it dips into the lubricant, on the contrary, it is not positively driven, and the driving means of the lubricator ring is arranged exclusively on the front face of the axle-journal. Axle-bearings in which the lubricant is conveyed to the place where it is required by a rotating lubricator ring are known per se. In these axle-bearings, however, the drive was not positive either for the rotation of the ring or for causing it to dip into the lubricant, and the power for rotation was generally obtained by friction, while the dripping movement into the lubricant was secured by utilizing the dead weight of the lubricator ring. Axle-bearings are also known in which the non-positive drive for rotating the ring is effected by gravity by providing the axle-journal and the inner surface of the lubricator ring with teeth which by virtue of the weight of the ring are brought into engagement with teeth on the journal. The teeth are not however permanently held in mesh and this non-positive drive for the rotation of the ring has the disadvantage that it can be neutralized by opposing forces which, for example, become effective if the lubricant hardens in the colder period of the year. In this case the lubricator ring does not penetrate into the lubricant and rises in consequence from its former seat on the journal, so that the frictional force or the toothed drive are put out of action. There is then no transfer of lubricant just at the starting of the vehicle in spite of the fact that lubricant is then particularly necessary because the coefficient of friction at rest and low speeds is greater than at high speeds. For these reasons the hitherto known ring lubricators have been a failure.

The axle-bearing lubrication proposed in accordance with the present invention by means of a lubricant conveyor ring which is positively driven in the direction of rotation and is not positively driven only in the direction in which it dips into the lubricant has the advantage over the known devices that the lubrication is effected with certainty in all cases and to the same extent as, for example, with the known top lubrication of the bearing. The danger that the ring will not dip into the lubricant, so that for example in spite of the positive drive of the conveyor ring in the direction of rotation no transfer of lubricant takes place, can be prevented by arranging a lug which abuts against the periphery of the conveyor ring and always maintains the eccentric position of the conveyor ring relatively to the centre of the journal and at high peripheral speeds strips the lubricant from the conveyor ring, so that it flows over suitably inclined guide surfaces to the place where it is required. The eccentric adjustment of the conveyor ring to the centre of the journal can preferably be automatically effected under the influence of its own dead weight.

In order to ensure on the one hand this automatic adjustment of the ring eccentrically to the centre of the journal and on the other hand to provide nevertheless the positive drive in the direction of rotation from the journal which is necessary if the lubricant is to be conveyed with certainty to the place where it is to be used, according to a further development of the invention, the ring is driven through the agency of members which are arranged in its nave and are guided in slot-like apertures in a transmission member which is driven from the axle-journal through the agency of members arranged in the latter and engaging slots which are at right angles to the former slots, the ring and transmission member being thus secured in the direction at right angles to the plane of revolution by the members arranged in the journal, and the nave of the ring is provided at the places where these members pass through it with circular apertures the diameter of which corresponds at least to the length of the slots in the transmission member. Therefore whereas the nave of the conveyor ring and the transmission member lie in common eccentrically to the centre of the axle journal in the direction of the slots in which the members arranged in the journal are received, in the direction at right angles thereto and of course in all intermediate positions between these two directions the nave of the conveyor ring becomes displaced relatively to the transmission member, so that the required uniform depth to which the ring dips into the supply of lubricant and its eccentric position to the centre of the journal is ensured in spite of the positive drive from the journal. Preferably the spokes arranged between the body of the conveyor ring and its nave are sharpened like a knife in the direction of revolution so that the resistance to the revolution of the ring is as small as possible. The axle brass in the plane of revolution swept by the conveyor ring is inwardly recessed or collared in order to catch the lubricant. Preferably the collar on the axle-brass which is formed thereby is provided with means for removing the lubricant from the conveyor ring which is effective in either direction of rotation of the conveyor ring. Collecting chambers or recesses are provided in the collar of the axle-brass on both sides of the lubricant removing means, by way of which the lubricant is conducted to the place in the axle brass where it is needed.

Various instructional embodiments of the invention are illustrated by way of example in the accompanying drawings, in which Fig. 1 is a vertical longitudinal section through an axle bearing constructed in accordance with the invention, and Fig. 2 is a front view of the journal and oil transfer device driven thereby.

Fig. 3 is a vertical longitudinal section through an axle bearing in accordance with the invention, having a somewhat different construction from that illustrated in Fig. 1.

Referring to the drawings, in all the figures, I represents the lubricant conveyor ring which transfers the lubricant from the sump 2 to the place 3 where it is required. In order to ensure the supply of lubricant to the place 3, the lubricant conveyor ring I is positively driven from the journal 4. In order to reduce the constructional height of the bearing the lubricant conveyor ring must further be arranged eccentrically of the central axis 5—5 of the journal. The eccentricity, which corresponds to the distance between the lines 5—5 and 6—6 (see Fig. 2) is so chosen that on the one hand the lubricant conveyor ring dips to a sufficient depth into the oil in the sump 2 and on the other hand so that it rests on the front collared part 7 of the axle brass 8 which is intended to receive it and to conduct the lubricant further. In this way the height of the axle-bearing is no greater than is already necessary for other reasons, so that in comparison with axle-bearings having centrifugal lubrication the arrangement of a casing of extended breadth for the centrifugal device is avoided. The axle bearing constructed in accordance with the invention can therefore be fitted to special cars, for example rubbish trucks and the like, in which the fitting of axle-bearings having a large casing for the centrifugal device causes difficulty.

The drive of the lubricant conveyor ring I from the journal 4 is carried out, in accordance also with the invention, in the following manner.

The nave of the conveyor ring is of plate-like form and is arranged in front of the front face of the journal collar 9 and parallel to it. The nave II is connected with the actual body of the ring I through the agency of knife-like spokes 10 sharpened in the direction of revolution. Parallel to the nave II there is arranged a further disc 12 which acts as transmission member. Both the nave II and the transmission member 12 are connected to the journal by means of bolts or studs 13, 14 so as to be carried round thereby. The bolts 13, 14 at the parts 15 and 16 are provided with spacing collars which prevent the disc 12 from clamping the nave II to the journal; the parts II and 12 thus can move both relatively one to the other and also separately with respect to the journal. The transmission member 12 is carried round by the members 13, 14 which are received in slots 17, 18 in the member 12. The transmission of the movement to the nave II on the other hand is effected by transmission members 19, 20 which are fixed in the latter and are guided in slots 21 and 22 in the transmission member 12. At the place where the members 13 and 14 which are fast in the journal 4 pass through the nave II of the conveyor ring, the nave II is provided with circular apertures 23 and 24, the diameters of which are equal to the length of the slots 17 and 18 in the transmission member 12.

This peculiar form of drive enables the following action to take place. The conveyor ring I, 10, II owing to its weight, takes up the position illustrated in Fig. 2, in which on the one hand it dips to a sufficient depth into the lubricant supply sump 2 and on the other hand rests directly on the collar 7 of the axle-brass. The conveyor ring I, 10, II maintains this position which is eccentric by the distance between the lines 5—5 to 6—6 below the centre of the journal also during the rotation of the journal. If it be imagined that the whole is turned through an agle of 90°, then the members 19, 20 lie in the same position relatively to the slots 21 and 22 as the members 13 and 14 are relatively to the slots 17 and 18 in Fig. 2. On the other hand the lines 6—6 and 5—5 coincide and the members 13 and 14 are situated at those points in the circular apertures 23 and 24 which are indicated in Fig. 2 by the numerals 25 and 26. Thus the transmission member makes only a to and fro movement in the direction determined by the slots 17 and 18 whereas the nave II and therefore the whole conveyor ring makes a backward and forward movement in the direction of the slots 21 and 22 relatively to the transmission member 12. The result is thereby obtained that the conveyor ring I makes a rotational movement which is eccentric to the rotational movement of the axle-journal 4 in spite of the fact that it is carried round positively by the latter. In order that the conveyor ring I may retain its eccentric position even when its weight cannot come freely into action, for example if it sticks in consequence of the hardening of the lubricant, there is arranged in the axle-box 27 above the transfer device a projection 28 which automatically prevents the ring from rising. This projection at high peripheral speeds can strip the lubricant from the outside of the conveyor ring, after which it flows over inclined guide surfaces in the axle-box or in a separate intermediate piece to the place where it is required. It will be clear that the driving connection between the journal and the lubricant conveyor is such that the latter is positively driven by and remains interlocked with the journal at all speeds of the latter, the connection between the journal and conveyor being thus inseparable, that is, it is maintained against the action of centrifugal force and is not affected by solidification of the lubricant, which tends to lift the conveyor.

For conducting the lubricant to the place where it is required, the axle-brass 8, as previously mentioned, is inwardly recessed or collared in the plane of revolution swept by the conveyor ring 1. The collar 7 has a rib 29 which bears against the inside of the conveyor ring and removes the lubricant which is carried round in the direction of rotation by the conveyor ring. Collecting recesses or chambers 30 and 31 are arranged on both sides of the rib 29, from which the lubricant reaches the place 3 where it is required by way of passages which are not indicated in the drawings.

From the above it will be seen that I have provided a lubricating mechanism, particularly for axle bearings, in which a lubricant conveyor ring in the form of a naved disc-like member is connected positively with the journal so as to rotate therewith and that this driving connection is maintained in all vertical positions of the conveyor ring.

The invention is not limited to the form of construction of the driving means for the conveyor ring which has been illustrated and described. On the contrary all kinematic trains whereby it is possible to drive the conveyor ring positively in the direction of rotation and non-positively in the direction in which it dips into the lubricant are included in the invention.

Fig. 3 shows with the same reference numerals an arrangement similar to that of Figs. 1 and 2 but with the difference that a separate intermediate piece 32 is arranged between the axle-box 27 and the axle-brass 8 in order to enable the axle-brass to be easily removed by raising the axle-box. In this case the projection 28 is preferably formed on the intermediate piece 32.

I claim:

1. In an axle bearing for railway vehicles the combination comprising an axle box having a lubricant sump at the bottom thereof, an axle journal, a rotating conveyor ring for the lubricant, said lubricant conveyor ring having a nave portion arranged opposite the front end face of the axle journal, and means connected with said journal and penetrating and permanently interlocking with said nave portion to compel the ring in all possible positions thereof to rotate eccentrically with reference to the journal in the direction of rotation of the journal about an axis lower than that of the latter, said ring being so mounted on the journal that its own weight is effective to move the same to its lowest possible position to maintain a substantially uniform depth of immersion of said ring in the lubricant.

2. In an axle bearing for railway vehicles the combination comprising an axle box, an axle journal, a rotating conveyor ring for the lubricant having a nave at the center thereof, circular apertures in the nave of said lubricant conveyor ring, a transmission member bearing against the nave of said lubricant conveyor ring, pairs of slots in said transmission member at right angles to each other, driving studs or bolts in the front face of the axle journal extending into one pair of slots of the transmission member and adapted to rotate said transmission member positively, and driving studs in the nave of the lubricant conveyor ring extending into the pair of slots of the transmission member arranged at right angles to the first mentioned slots, said conveyor ring adapted to be rotated by said transmission member through said last-mentioned studs.

3. In an axle bearing for railway vehicles the combination comprising an axle box, an axle journal having a lubricant sump at the bottom thereof, a rotating conveyor ring for the lubricant having a nave at the center thereof, said conveyor ring nave arranged opposite to the front end face of the axle journal, knife-like spokes between the nave and the ring element of the lubricant conveyor, means for providing positive rotation of said lubricant conveyor ring eccentrically of the journal in the direction of rotation of the latter, said ring being movable in a vertical plane relatively to the journal, and means arranged to confine said ring to its lowermost position to insure a substantially uniform depth of immersion of the lubricant conveyor ring in the lubricant.

4. In an axle bearing for railway vehicles the combination comprising an axle box having a lubricant sump at the bottom thereof, an axle journal, a rotating conveyor for the lubricant comprising a nave portion arranged opposite to the front and end face of the axle journal and a ring portion extending inwardly of the journal and surrounding the same, an axle brass, said axle brass recessed in the plane of revolution swept by the lubricant conveyor ring portion to receive the lubricant raised by the conveyor, means connected to the journal for driving said lubricant conveyor positively and eccentrically of the journal in the direction of rotation of the journal, about an axis lower than that of the journal, said conveyor being movable in a vertical plane relatively to the journal, and means arranged to confine said ring to its lowermost position to insure a substantially uniform depth of immersion of the lubricant conveyor ring portion in the lubricant.

5. In an axle bearing for railway vehicles the combination comprising an axle box having a lubricant sump at the bottom thereof, an axle journal, a rotating conveyor for the lubricant including a nave portion arranged opposite the front end face of the axle journal, and a ring portion extending inwardly of the journal and surrounding the same, an axle brass, said axle brass recessed in the plane of revolution swept by the lubricant conveyor ring portion to receive the lubricant raised by the conveyor, a stripper arranged to bear upon the inner surface of the conveyor ring portion to remove the lubricant adhering thereto, means connected to the journal for driving said lubricant conveyor positively and eccentrically of the journal in the direction of rotation of the journal about an axis lower than that of the journal, said conveyor being movable in a vertical plane relatively to the journal, and means arranged to confine said ring to its lowermost position to insure a substantially uniform depth of immersion of the lubricant conveyor ring in the lubricant.

6. In an axle bearing for railway vehicles the combination comprising an axle box having a lubricant sump at the bottom thereof, an axle journal, a rotating conveyor for the lubricant comprising a naved, disc-like member, said lubricant conveyor arranged opposite the front end face of the axle journal, means connected with said journal and interlocking with said conveyor for providing positive eccentric rotation of said conveyor in the direction of rotation of the axle journal about an axis lower than that of the journal, said conveyor being movable in a vertical plane relatively to the journal, and a projection bearing against the outer circumference of said lubricant conveyor to force the latter into its lower position to maintain automatically a substantially uniform depth of immersion of the lubricant conveyor in the lubricant.

7. In an axle bearing for railway vehicles, the combination comprising an axle box having a lubricant sump at the bottom thereof, an axle journal, a rotating conveyor for the lubricant comprising a central nave portion and a circumferential flange, and means for compulsorily connecting the nave of the conveyor with the journal while yet affording freedom of vertical movement of the conveyor relatively to the journal, said means maintaining a positive interlocking connection, inseparable by centrifugal force, between the journal and ring at all positions of the axis of the latter relatively to the axis of the journal.

8. In an axle bearing for railway vehicles, the combination comprising an axle box having a lubricant sump at the bottom thereof, an axle journal, a rotating conveyor for the lubricant comprising a plate member arranged opposite the end face of the journal, means for supporting said plate member eccentrically upon the journal and compelling the same to follow the movement of the journal, said plate member being movable in a vertical plane relatively to said journal, and means arranged to compel the plate member to assume its lowest position wherein the peripheral portion of the said member is immersed in the lubricant, whereby at all speeds of the journal and in all conditions of the lubricant the conveyor is compelled to enter the body of lubricant in the sump.

9. In an axle bearing for railway vehicles, the combination comprising an axle box having a lubricant sump at the bottom thereof, an axle journal, a spoked rotating conveyor ring for the lubricant, and means for supporting said conveyor ring eccentrically from the end face of the journal and interlocked with said conveyor ring to compel the same to follow the movement of the journal, said supporting means enabling the conveyor ring to move in a vertical plane relatively to the journal in all angular positions of the journal to maintain the geometrical center of the conveyor ring always below the axis of the journal, and remaining interlocked with said ring in all vertical positions that the ring can assume during the rotation of the journal.

10. In an axle bearing for railway vehicles the combination comprising an axle box having a lubricant sump at the bottom thereof, an axle journal, a rotating conveyor for the lubricant arranged at the front end of the axle journal comprising a naved disc-like member, means for positively and eccentrically interlocking said conveyor with said journal to cause the conveyor to be driven constantly during the rotation of the axle journal, and means acting additionally to the weight of the conveyor for compelling said conveyor to assume its lowest position wherein it rotates about an axis lower than that of the journal to insure a substantially uniform depth of immersion of the conveyor in the lubricant at all speeds of the journal.

11. In an axle bearing for railway vehicles, the combination comprising an axle box having a lubricant sump at the bottom thereof, an axle journal, a naved, disc-like rotating conveyor for the lubricant, means for supporting the conveyor eccentrically upon the journal, said conveyor being movable in a vertical plane relatively to the journal so that its axis may assume a position below that of the journal in all angular positions of the journal, the supporting means for the conveyor maintaining at all times and in all vertical positions that the conveyor can assume during the rotation of the journal a positive interlock between the conveyor and the journal which compels the conveyor to follow the movements of the journal against the action of centrifugal force, and means arranged to compel said conveyor to assume substantially its lowest positions at all angular positions and at all speeds of the journal to insure a substantially uniform depth of immersion of the conveyor in the lubricant at all speeds of the journal and in all conditions of the lubricant.

12. In an axle bearing for railway vehicles, the combination comprising an axle box having a lubricant sump at the bottom thereof, an axle journal, a rotating conveyor ring for the lubricant comprising a naved, disc-like member disposed eccentrically to the journal axis and arranged opposite the front end face of the journal, means constantly contacting the lubricant conveyor ring to wipe lubricant therefrom, and means including a slot and bolt connection between the journal and conveyor for suspending the conveyor from the journal while permitting relative vertical movement therebetween.

13. In an axle bearing for railway vehicles, the combination comprising an axle box having a lubricant sump at the bottom thereof, an axle journal, a rotating conveyor ring for the lubricant disposed eccentrically to the journal axis and arranged opposite the front end face of the journal, means constantly contacting the lubricant conveyor ring to wipe lubricant therefrom, a transmission member associated with the conveyor ring, a slot and bolt drive between the journal and transmission member, and a loose connection between the latter and said conveyor ring adapted to permit the latter to move vertically with respect to the transmission member.

14. In an axle bearing for railway vehicles, the combination comprising an axle box having a lubricant sump at the bottom thereof, an axle journal, a rotating conveyor ring for the lubricant disposed eccentrically to the journal axis and arranged opposite the front end face of the journal, means constantly contacting the lubricant conveyor ring to wipe lubricant therefrom, a transmission member associated with the conveyor ring, a slot and bolt drive between the journal and transmission member, and a slot and bolt connection between the transmission member and the conveyor ring.

15. In an axle bearing for railway vehicles, the combination comprising an axle box having a lubricant sump at the bottom thereof, an axle journal, a rotating conveyor ring in the form of a naved, disc-like member for lifting lubricant from the sump on to the journal, means connected with the journal for transmitting rotary movement to the conveyor ring, said means eccentrically mounting the conveyor ring on the journal and operating to compel the conveyor ring to partake of the rotary movement of the journal in all vertical positions that the ring can assume during the rotation of the journal.

16. In an axle bearing for railway vehicles, the combination comprising an axle box having a lubricant sump at the bottom thereof, an axle journal, a rotating conveyor ring in the form of a naved, disc-like member for lifting lubricant from the sump on to the journal, and an intermediate member between the journal and ring eccentrically mounting the ring on the journal and operating to transmit the rotary movement of the journal to the ring in all vertical positions that the ring can assume during the rotation of the journal.

VICTOR ALEXANDER BARY.